United States Patent [19]

Burton et al.

[11] 4,291,384

[45] Sep. 22, 1981

[54] TAPE GAUGE SYSTEM

[75] Inventors: James M. Burton, Seattle; Robert L. Miller, Bothell; Jansey D. Tieden, Puyallup, all of Wash.

[73] Assignee: The Boeing Company, Seattle, Wash.

[21] Appl. No.: 150,512

[22] Filed: May 16, 1980

[51] Int. Cl.³ .............................................. G06K 5/04
[52] U.S. Cl. .................................. 364/560; 73/157; 235/437
[58] Field of Search ............... 364/560, 561; 235/437, 235/438, 92 DN; 73/157

[56] References Cited

U.S. PATENT DOCUMENTS

| 3,218,608 | 11/1965 | Barbeau | 371/54 |
| 3,558,862 | 1/1971 | McMillan | 73/157 |
| 3,953,713 | 4/1976 | DeLigt | 235/437 |
| 4,172,553 | 10/1979 | Feather et al. | 235/437 |

Primary Examiner—Charles E. Atkinson
Attorney, Agent, or Firm—Conrad O. Gardner; B. A. Donahue

[57] ABSTRACT

System for dynamically testing the dimensional accuracy of punched tape. A microprocessor controller and modified capstan drive tape reader are utilized to provide large volume checking of punched tape. Dimensional requirements of the tape are tested dynamically at tape reader speeds.

3 Claims, 5 Drawing Figures

TAPE GAUGE SYSTEM

This invention relates to tape gauge systems and more particularly to systems for checking the physical properties of punched tape.

Heretofore the patent literature has included systems of data reading after punching for verification such as shown in U.S. Pat. No. 3,218,608 issued Nov. 16, 1965 to Barbeau. However, such system does not check the physical measurements of the punch tape. However, U.S. Pat. No. 3,558,862 to McMillan issued Jan. 26, 1971 does show a system for checking the physical properties of punched tape.

U.S. Pat. No. 3,558,862 system checks the distance between the periphery of adjacent sprocket holes and does not take into consideration hole diameters.

Accordingly, it is an object of the present invention to provide means in a tape gauge system for performing a measurement between adjacent hole center lines thereby detecting elongated holes and double punching where adjacent holes overlap.

The system of U.S. Pat. No. 3,558,862 provides limited measuring accuracy, having a weight per count of only 0.0012 inches which either exceeds or nearly matches the tolerances to be measured thereby failing to provide a minimum resolution of 5 to 10 times of that to be measured.

In contrast, it is an object of the present invention to provide a tape gauge having a weight per count of 0.00035 inches.

The aforementioned McMillan system utilizes a sprocket drive mechanism to move the tape across a readhead. The spacing of the sprockets is set to match an ideal tape. Any variation in actual tape sprocket hole spacing will cause a change in tape velocity thereby affecting the accuracy of the measurement.

In contrast, the present system has as a further object, the utilization of means including a flat roller or capstan drive which is velocity independent of any hole spacing on the tape.

The McMillan system further utilizes a fixed internal clock to perform measurements thereby requiring a highly constant tape velocity which is difficult to achieve.

In contrast, it is yet another object of the present invention to provide in a tape gauge system, a high resolution encoder directly connected to the tape driving capstan thereby providing a dynamic measurement source which is independent of tape velocity.

The system of U.S. Pat. No. 3,588,862 does not check basic data reliability while the system in accordance with an embodiment of the present invention checks each line for proper parity thereby insuring that no missing punches will be bypassed.

The importance of punched tape in data handling since the advent of numerical controlled machining is well recognized. Perforated tape has been a weak link in the state of the art. Dimensional accuracy required by reading and/or punching equipment has been difficult to maintain, especially on a high volume production environment. Industry standards have been established for minimum punching accuracy including E.I.A. (Electronic Industries Association) Standard RS-227-A of October 1971, which defines the accuracy requirements for perforated tape.

High cost numerically controlled machine tools utilize punch tape for a data media, with thousands of feet per month being utilized to support each machine. Due to the high cost parts being machined, it is of great importance that tape errors be eliminated or detected before being released for production use.

Recognizing from the preceding the importance of errors, it is recognized that punching errors fall into the following categories:

(1) Parity

Each character on a tape must be represented by an odd or even number of holes, depending on the data format being used. This odd or even requirement is referred to as parity, and is used to satisfy data "checking" by the device reading the tape. Representative numerical control system readers are programmed to check for odd parity. Detection of even parity will halt the control.

Typically parity errors account for 66 percent of the total tape errors.

(2) Edge Margin

The distance between the feed holes and the reference edge of the tape is to be 0.392±0.004 inches. This specified tolerance is the edge margin. Poor control of edge margin will cause intermittent reading errors. Edge margin accounts for approximately 10 percent of the total tape errors.

(3) Longitudinal Spacing

The distance between successive rows of data holes (characters) is specified to be 0.100±0.003 inches. Cumulative error tolerance decreases from 3 percent between pairs of holes to 1 percent for ten (10) holes and 0.5 percent for 50 holes. Longitudinal spacing accounts for 15 percent to 25 percent of total tape errors. Spacing, as an error category can vary quite widely depending upon the punch maintenance.

Double Punching

This is an extreme case of longitudinal spacing. The distance between successive rows is reduced to a point where adjacent holes meet, making a row of elongated holes. This case is either missed by the reading device or detected as a parity error.

A present method of checking dimensional requirements of punched tape for compliance to established specifications is by a manual procedure utilizing a scribed standard. This standard (similar to a ruler) varies in length from a minumum of five (5) inches and has scribed lines (or holes drilled) at the required spacing. By aligning the punched tape over the standard, a small section of the tape can be visually compared to the standard. This method is only practical for spot checks. There is therefore a critical need for 100 percent checking of punched tape.

In satisfaction of the preceding objects and requirements, an embodiment of this invention includes an electronic tape gauge utilizing a microprocessor controller and capstan drive tape reader thereby providing large volume checking of punched tape. Dimensional requirements of the tape are tested dynamically at tape reader speeds. The electronic tape gauge according to the present embodiment of the invention provides verification in a first direction e.g. tape fed either head first or tail first, and switches are included to provide for reversal of either spool independently to allow for reels wound in either direction. Hub adaptors provide accommodation for various type spools.

The foregoing objects and many attendant advantages of this invention will become more readily apparent as the same becomes better understood by reference to the following detailed description when taken in conjunction with the accompanying drawings wherein.

Figure 1:
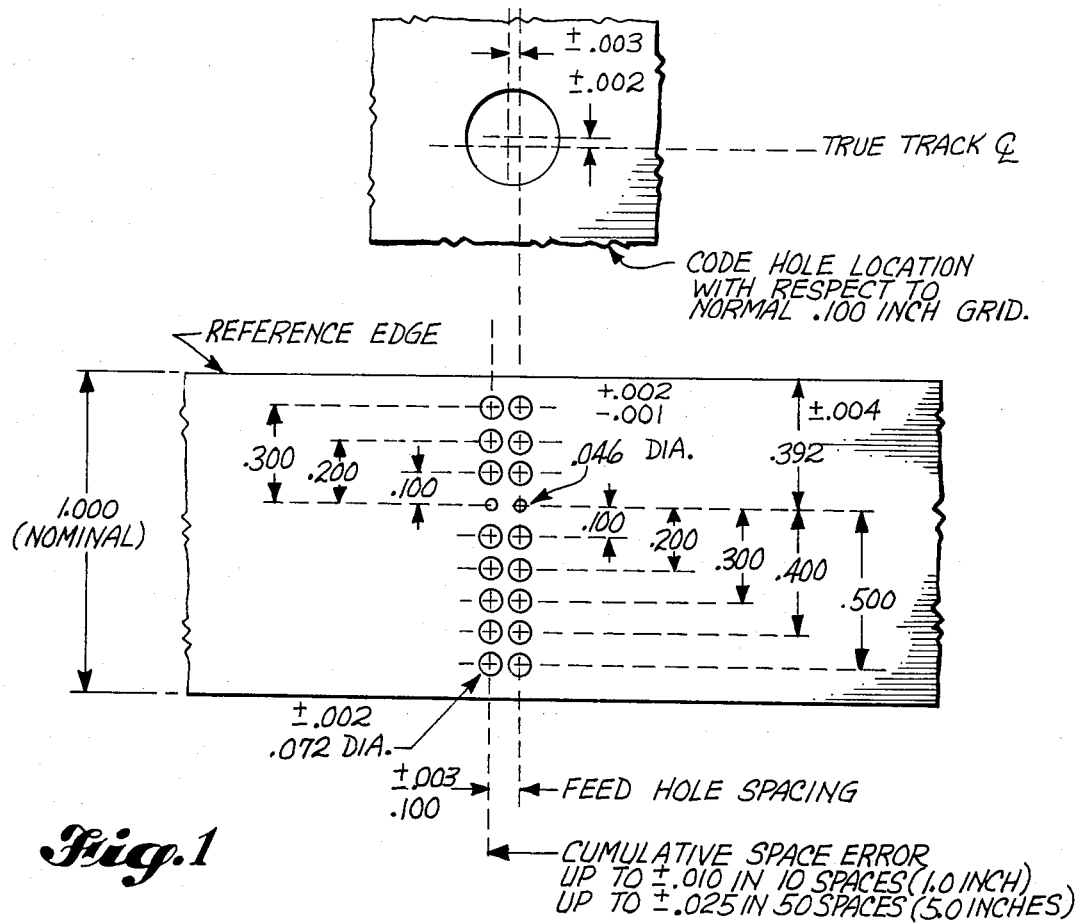
FIG. 1 is a diagram defining accuracy requirements for perforated tape.

Although the problem of dimensional accuracy was hereinbefore discussed, reference to FIG. 1 now will enable an understanding of industry standards which have been established for minimum punching accuracy. The diagram of FIG. 1 shows the actual E.I.A. Standard RS-227-A dated October 1971, which defines the accuracy requirements for perforated tape. Adherence to the above standard in dimensional accuracy required by reading and/or punching equipment has been difficult to maintain.

Figure 2:
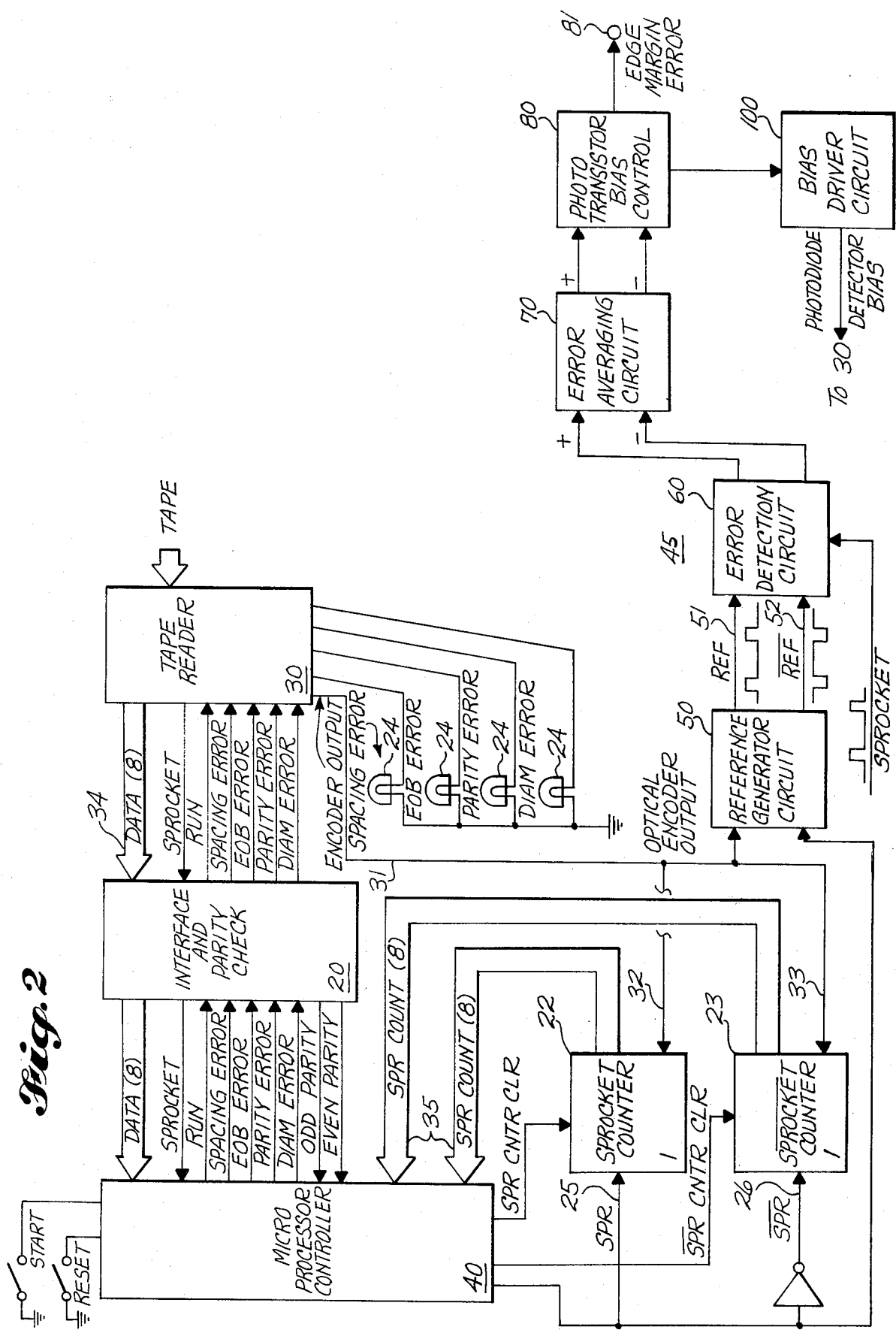
FIG. 2 is a system block diagram of a preferred embodiment of the present electronic tape gauge system; and, FIGS. 3-5 taken in numerical sequence provide a flow chart of the logic used in programming the electronic tape gauge system of FIG. 2.

Turning now to FIG. 2, there is now an electronic tape gauge system which utilizes a microprocessor controller 40 and a modified capstan drive tape reader 30 to make possible large volume checking of punched tape.

Capstan drive tape reader 30 is utilized to transport tape over a photoelectric readhead at approximately 350 characters per second. The readhead detects the presence or absence of sprocket and data holes. A high resolution optical encoder within tape reader 30 is directly coupled to the capstan drive to provide encoder output signal 31. Encoder output signal 31 is coupled to a reference generator circuit 50.

Encoder output signal 31 is coupled as input signals 32 and 33 to a pair of binary counters 22 and 23, viz. sprocket hole present counter 22 and sprocket hole not present counter 23. The binary count in each of counters 22 and 23 is directly proportional to the sprocket hole diameter and space between holes, respectively. Microprocessor 40 alternately examines the contents of counters 22 and 23 and compares this value with software defined limits and it an out of tolerance condition is encountered, the tape gauge system stops and the appropriate one of error condition lights 24 is illuminated.

The present tape gauge system is programmed to detect odd parity (even parity is representative of an error condition) and correct end of block (EOB) punches. Correct EOB specifies that if channel 8 (data 8) is punched, no other channel shall be punched. The longitudinal dimensions checked by the present tape gauge system are sprocket hole diameters and spacing between adjacent sprocket holes. Since the present tape gauge system includes no means of measuring traverse dimensions, edge margin is not directly checked. Bad edge margin, however, will result in a hole diameter error since any traverse displacement of the sprocket hole results in a smaller diameter as seen by the photodetector.

The present tape gauge system is seen in FIG. 2 to include an automatic edge margin detector circuit 45. Edge margin normally occurs over an extended length of tape. The hole to hole variances are usually quite small. The error increases until the limit is reached. The edge margin can affect the longitudinal measurement. Also, the shifting of the hole towards the tape edge makes it appear small. To compensate for this effect, edge margin detector circuit 45 controls the bias of the photoelectric diodes of the aforementioned photoelectric readhead in tape reader 30. This closed loop arrangement insures that proper measurements are made independent of edge margin.

Referring now more specifically to the electronic tape gauge system of FIG. 2, it will be seen that tape reader 30 output signals 34 are coupled through interfacing means 20 to microprocessor controller 40 and counter output signals 35 are also coupled as input signals to microprocessor controller 40. These input signals are analyzed and provide the microprocessor controller 40 output signals shown. The output logic is under control of the system software hereinafter shown by a flow chart of the logic used in programming the present tape gauge system and accompanying description.

Sprocket counters 22 and 23 are alternately enabled by the gating of sprocket (feedhole) signals 25 and 26. The count contained in sprocket counters 22 and 23 is representative of the physical dimensions of the hole diameters and the length of the spaces between holes in the longitudinal direction. Microprocessor controller 40 alternately samples the count and then resets the counter to prepare it for the next counting interval.

Interface and parity checking means 20 is utilized to translate logic levels from tape reader 30 and provide drive for indicator lights 24, and further includes a hardware parity checker for reducing software overhead. An odd or even parity signal is generated when data holes are present.

Tape reader 30 is a conventional 500 characters per second capstan drive tape reader modified to include a high resolution optical encoder directly coupled to the capstan drive to provide tape dimension feedback. Tape reader 30 further utilizes all regulated voltages and regulated brightness of the light source for the photodetectors. Speed of the tape reader 30 is reduced from conventional 500 characters per second to 350 characters per second to provide adequate computer calculating time. Utilizing a 2500 count per revolution encoder and two channels, the count is multiplied by four to give 10,000 counts per revolution. With a capstan diameter of 1.125 inches, this results in a revolution of 0.00035 inches for measuring tape dimensions.

Microprocessor controller 40 comprises a single board computer receiving inputs from tape reader 30, decoding data, controlling and evaluating sprocket counter 22 and 23 information to provide error indications. Start sequencing, reset operation, and automatic control of tape reader 20 is also provided.

Edge margin detector circuit 45 hereinbefore discussed includes reference generator circuit 50, error detection 60, error averaging circuit 70, phototransistor bias control circuit 80 for providing a signal at output terminal 81 representative of edge margin error, and bias driver circuit 100.

Reference generator circuit 50 is responsive to clock impulses 31 (generated by an encoder attached to the capstan drive of tape reader 30) to provide ref and $\overline{\text{ref}}$ signals 51 and 52. Reference generator circuit 50 comprises a switch selectable divider which controls the duty cycle of signals 51 and 52 based on switch settings thereby providing a selectable sprocket reference which is automatically corrected for capstan drive speed variations. In error detection circuit 60, the true sprocket on/off signal is gated with input ref and $\overline{\text{ref}}$ signals 51 and 52 to provide a positive or negative error pulse every sprocket hole.

Edge margin detector circuit 45 further includes error averaging circuit 70 coupled downstream from error detection circuit 60. Since error correction at every sprocket hole is undesirable, error averaging circuit 70 comprises a counter which averages the errors over 12.8 inches of tape and produces an error pulse every time excessive errors 8 more than the opposite polarity occurs.

Phototransistor bias control circuit 80 is responsive to the output of error averaging circuit 70, and comprises an up/down counter preset to center count (zero) using positive and negative polarity error pulses to shift value as averaged errors occur. This count is utilized as input to bias driver circuit 100. If a carry or borrow occurs from the counter, an excessive edge margin error indication signal is generated at output terminal 81.

Bias driver circuit 100 utilizes an 8 bit digital to analog converter having a range gased on the reference used (0 to 10 VDC). The 8 bit converter is driven by the aforementioned counter of phototransistor bias control circuit 80 and provides an output which is summed through an attenuator to a unity gain operational amplifier which output is utilized to drive a transistor capable of supplying all bias currents of the phototransistors in tape reader 30.

By means of the aforementioned control of bias current to the phototransistors, the sensitivity of the phototransistors is controlled. This directly affects the sprocket signal since the phototransistor sensitivity controls the sprocket signal duty cycle. This circuit, in effect, establishes a phase lock loop servo system on the sprocket signal. If a condition exists that a borrow or carry from the bias control occurs, a signal representative of edge margin error is present at output terminal 81. Microprocessor controller 40 stops further signal processing and the edge margin error lamp (not shown, but coupled to output terminal 81) is illuminated.

Figure 3:
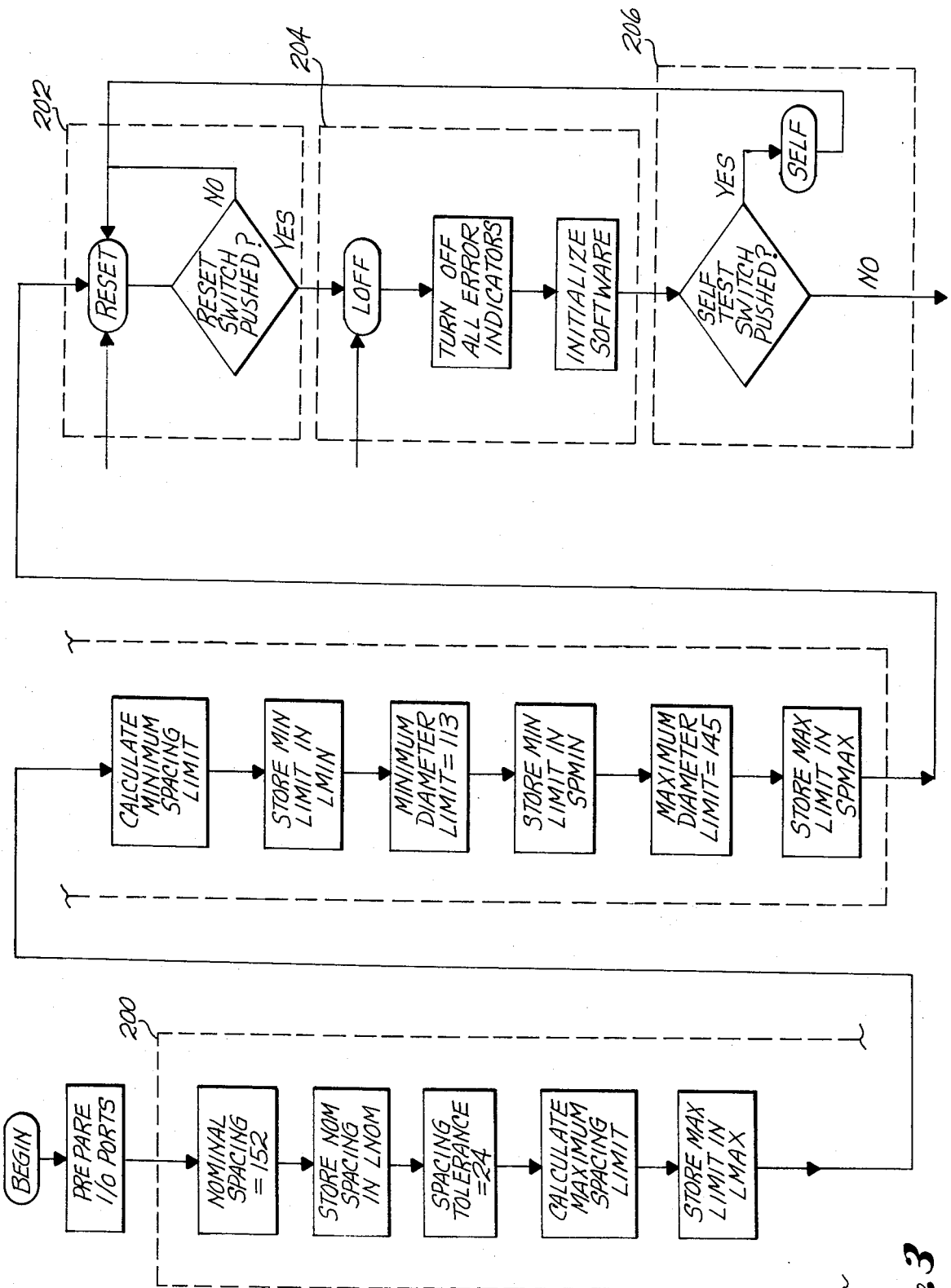
Figure 4:
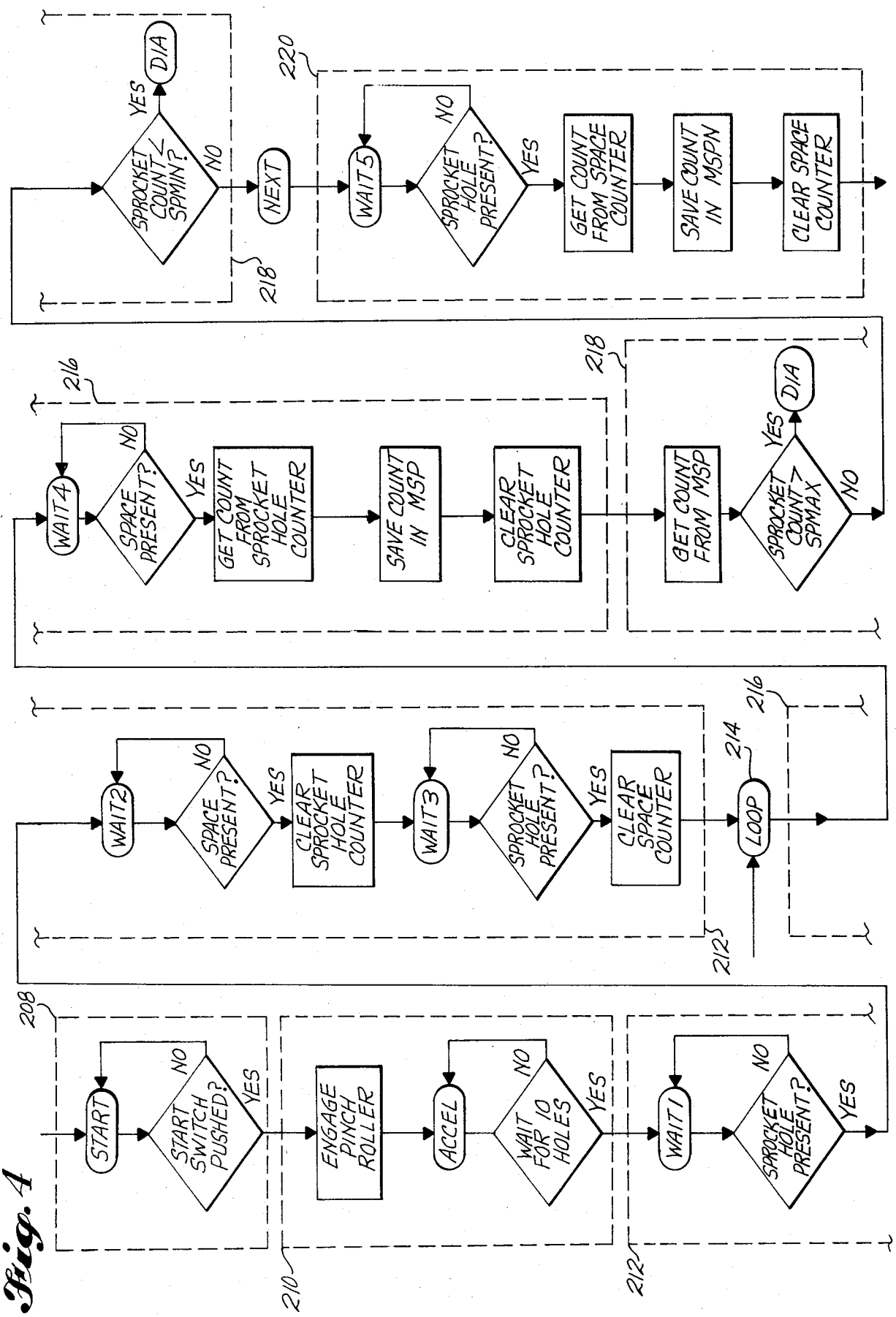
Figure 5:
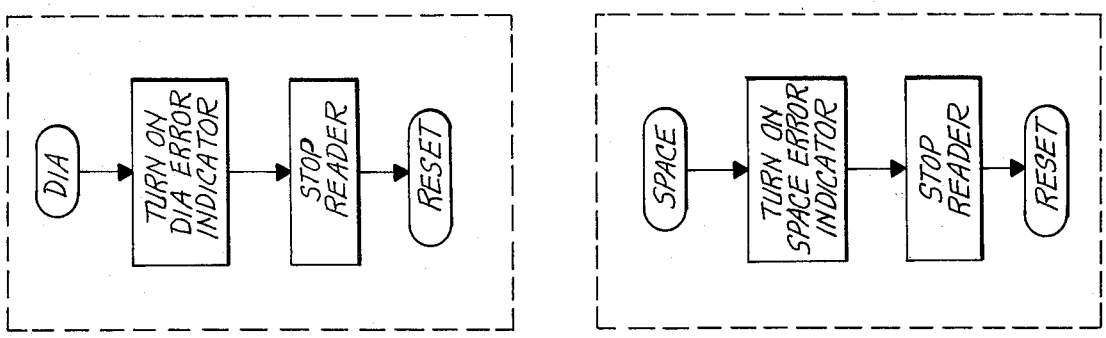
Figure 5:
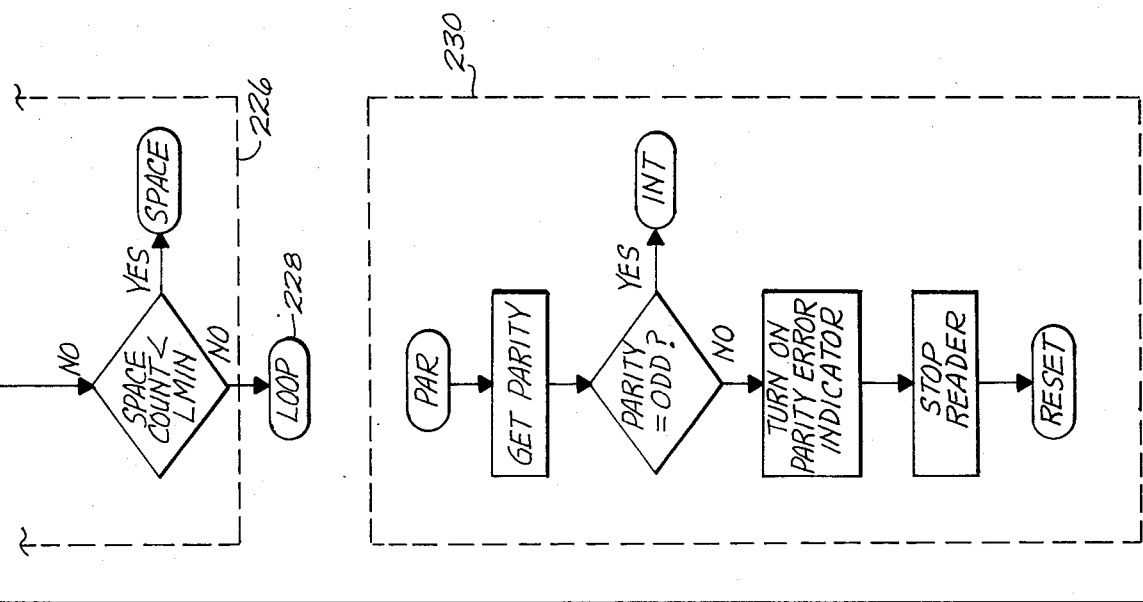
Figure 5:
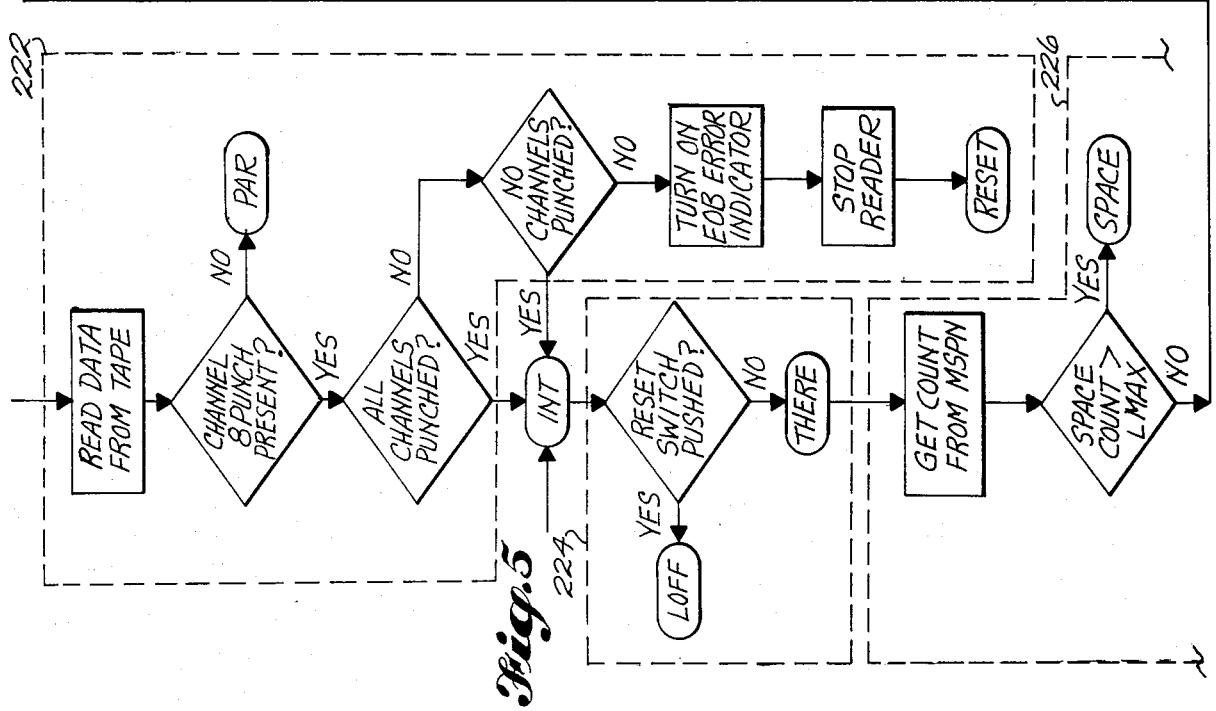

A flow chart of the logic used in programming the electronic tape gauge system of FIG. 2 is shown in FIGS. 3 through 5. The following comments are provided by way of further explanation in regard to FIGS. 3 through 5:

200

The programmer supplies the nominal hole spacing, spacing tolerance band, and the maximum and minimum hole diameters. The software converts these numbers to 16 bit negative values to be used later in double precision subtraction. The software also calculates maximum and minimum hole spacing from the nominal tolerance band provided. All of these limits are then stored in random access memory (RAM) for future access.

202

Wait for reset button to be depressed. This is also an entry point after occurrence of an error condition.

204

This is the entry point after reset switch is pushed during test (stop mode).

206

Provisions are provided to add self test features subsequently as desired.

208

Wait here for start switch to be depressed.

210

Tape movement begins but 10 holes pass by before testing begins. This allows for slippage during acceleration.

212

A sequence of hole-space-hole is executed to clear counters and initiate counting in the proper sequence.

214

Software loop begins here.

216

The sprocket counter has finished counting at the occurrence of a space present. The count is then retrieved from the sprocket counter and stored in RAM. Then the sprocket counter is cleared in preparation for the next sprocket.

218

Test the sprocket diameter for proper tolerance. If error condition exists, light indicator and stop tape reader.

220

The space counter has finished counting at the occurrence of a sprocket present. The count is then retrieved from the space counter and stored in RAM. Then the space counter is cleared in preparation for the next space.

222

The data character is read and checked for correct parity and end of block (EOB) character. A correct EOB is specified as no punches being present except channel 8. The exception is when all channels are punched, no error condition is initiated. This allows testing of bias tapes.

224

The monitoring of the reset switch within the software loop allows the reset switch to also serve as a stop switch.

226

Test the space distance between holes for proper tolerance. If error condition exists, light indicator and stop tape reader.

228

Return to loop.

230

Check for correct parity. Even parity creates an error condition.

We claim:
1. A system for dynamically testing the dimensional accuracy of punched tape comprising in combination:
   a tape reader having a plurality of error condition lights;
   said tape reader having an optical encoder output signal;
   a first binary counter having a count directly proportional to sprocket hole diameter;

a second binary counter having a count directly proportional to space between holes;

said optical encoder output signal coupled to said first and second binary counters;

a microprocessor controller coupled to said first and second binary counters for examining the contents of said first and second binary counters and comparing the respective values obtained from said first and second binary counters with predetermined limits, said microprocessor controller further coupled to said tape reader for stopping said tape reader and illuminating one of said plurality of error condition lights in the event of the detection of an out of tolerance condition; and, an edge margin error detection circuit responsive to said optical encoder output signal for providing a signal at an output terminal representative of edge margin error.

2. An edge margin detector circuit having an output terminal and comprising:

a reference generator circuit responsive to optical encoder output signals and sprocket signals;

an error detection circuit responsive to the outputs of said reference generator circuit and a true sprocket on/off signal for providing a positive or negative error pulse for every sprocket hole; and an error averaging circuit coupled between said error detection circuit and said output terminal.

3. An edge margin error detector circuit according to claim 2 wherein said error averaging circuit comprises a counter for averaging the errors and providing an error pulse in the event of the occurrence of errors greater than a predetermined number greater than the opposite polarity.

* * * * *